(12) United States Patent
Matsumoto

(10) Patent No.: US 7,710,475 B2
(45) Date of Patent: May 4, 2010

(54) SOLID-STATE IMAGE PICKUP DEVICE, METHOD FOR TRANSFERRING CHARGE IN SOLID-STATE IMAGING DEVICE AND METHOD FOR MANUFACTURING SOLID-STATE IMAGING DEVICE

(75) Inventor: Koichi Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1180 days.

(21) Appl. No.: 10/540,765

(22) PCT Filed: Dec. 12, 2003

(86) PCT No.: PCT/JP03/15941

§ 371 (c)(1), (2), (4) Date: Jun. 24, 2005

(87) PCT Pub. No.: WO2004/059741

PCT Pub. Date: Jul. 15, 2004

(65) Prior Publication Data

US 2006/0055801 A1    Mar. 16, 2006

(30) Foreign Application Priority Data

Dec. 25, 2002   (JP)   ............................. 2002-373414

(51) Int. Cl.
  *H04N 3/14*   (2006.01)
  *H04N 5/335*  (2006.01)
  *H04N 9/04*   (2006.01)
  *H01L 31/062* (2006.01)
  *H01L 31/113* (2006.01)

(52) U.S. Cl. .................. 348/273; 348/300; 257/291
(58) Field of Classification Search ......... 348/272–274, 348/277, 300–302, 311; 257/440, 463
See application file for complete search history.

(56) References Cited

U.S. PATENT DOCUMENTS

| 5,179,428 | A |   | 1/1993  | Lee |
| 5,995,249 | A | * | 11/1999 | Sato et al. ............... 358/514 |
| 6,606,120 | B1 | * | 8/2003 | Merrill et al. ............ 348/273 |
| 2002/0058353 | A1 | * | 5/2002 | Merrill .................... 438/57 |

* cited by examiner

*Primary Examiner*—Kelly L Jerabek
(74) *Attorney, Agent, or Firm*—Sonnenschein Nath & Rosenthal LLP

(57) ABSTRACT

A solid-state image pickup device including a layered structure which includes an electric-charge transfer section The photosensors include a first photosensor particularly sensitive to light of a first wavelength and a second photosensor particularly sensitive to light of a second wavelength shorter than the first wavelength. The first photosensor and the second photosensor are adjacently located but separated by a potential barrier section. A read gate located beneath the first photosensor and transports electric charge from the first photosensor to an electric-charge transfer section located beneath the second photosensor.

10 Claims, 9 Drawing Sheets

SOLID-STATE IMAGE PICKUP DEVICE, METHOD FOR TRANSFERRING CHARGE IN SOLID-STATE IMAGING DEVICE AND METHOD FOR MANUFACTURING SOLID-STATE IMAGING DEVICE

TECHNICAL FIELD

The present invention relates to a solid-state image pickup device and an electric-charge transfer method adopted by the device. To put it in detail, the present invention relates to a solid-state image pickup device capable of reducing smears generated in a red-color sensor portion and an electric-charge transfer method adopted by the device.

BACKGROUND ART

A recent solid-state image pickup device utilizing a semiconductor has its chip area reduced by shrinking the size of a pixel device. As a result, the cost per chip can also be lowered as well. In addition, the size of an image pickup apparatus (or a camera system) itself can also be decreased.

The image pickup device includes mainly a photoelectric conversion device for converting a light beam coming from a lens into a signal electric charge and a transfer CCD (Charge Couple Device) for delivering the signal electric charge to an amplifier for converting the signal electric charge into an output voltage. In a typical configuration of a pixel cell of an image pickup device, a photoelectric conversion device and a transfer CCD are laid out horizontally. With such a layout, however, it becomes practically difficult to shrink the size of the image pickup device during a fabrication process. In order to solve this problem, a solid-state image pickup device has been proposed recently as a device with a layered structure in which a photoelectric conversion device is provided above a transfer CCD. For more information, refer to documents such as pages 3 and 4 as well as FIG. 2 of Japanese Patent Laid-open No. 2001-257337.

In accordance with this conventional technology, however, transfer CCDs provided below a photoelectric conversion device for RGB (Red, Green and Blue) pixels are not separated away from each other. For this reason, a light beam having a large wavelength as is the case with a red-color light beam for a red-color pixel of the RGB pixels penetrates the photoelectric conversion device and hits the transfer CCDs to raise a smear problem caused by mixing of a noise signal with signal electric charge being transferred. In order to solve this problem, a generation rate of smears for the depth of the semiconductor area of the transfer CCD was examined with the depth of a photosensor taken as a parameter. Results of the examination are shown in FIGS. 9A and 9B. In FIGS. 9A and 9B, the depth of a photosensor is taken as a parameter, the vertical axes each represent the generation rate (or the cumulative generation rate) of smears and the horizontal axes each represent the depth of the semiconductor area of the transfer CCD. To be more specific, FIG. 9A shows examination results for a red-color light beam having a wavelength of 700 nm. On the other hand, FIG. 9B shows examination results for a green-color light beam having a wavelength of 550 nm. In the case of a structure with X=5 μm and ΔX=0.5 μm where notation X denotes the depth of the photosensor whereas notation ΔX denotes the depth of the semiconductor area of the transfer CCD, for example, the generation rate of smears for a light beam with a wavelength of 700 nm (that is, for a red-color light beam) approaches about 4% as shown in FIG. 9A. For a light beam having a wavelength of 550 nm (that is, for a green-color light beam), on the other hand, the generation rate of smears is about 1% as shown in FIG. 9B. As is obvious from the results of the examination, the generation rate of smears for a red-color light beam is extremely high.

DISCLOSURE OF INVENTION

The present invention is a solid-state image-pickup device capable of solving the problems described above and an electric-charge transfer method adopted by the device.

A first solid-state image pickup device provided by the present invention includes a solid-state image pickup device including photosensors and an electric-charge transfer section, which are provided in a layered structure. To be more specific, the photosensors include a first photosensor and a second photosensor for receiving a light beam having a wavelength smaller than the wavelength of a light beam received by the first photosensor. The first and second photosensors are provided at adjacent locations separated away from each other by a potential barrier section. Below the first photosensor, a read gate is provided as a gate for transporting electric charge generated by the first photosensor to an electric-charge transfer section provided beneath the second photosensor.

To put in detail, in the first solid-state image pickup device cited above, the first photosensor for receiving only a light beam having a large wavelength converts the light beam having a large wavelength into a signal electric charge in a photoelectric conversion process. The read gate transports the signal electric charge to the electric-charge transfer section provided below the second photosensor for receiving a light beam having a wavelength smaller than the wavelength of the light beam received by the first photosensor. The electric-charge transfer section further transfers the signal electric charge transported by the read gate thereto. An example of a light beam having a large wavelength is a red-color or green-color light beam and an example of a light beam having a small wavelength is a blue-color light beam. Thus, under the first photosensor for receiving a light beam having a large wavelength, no signal electric charge of the light beam having a large wavelength is transferred. As a result, even if a large-wavelength light beam such as a red-color light penetrates the first photosensor as is the case with the conventional solid-state image pickup device, entering a space beneath the first photosensor, the light beam with the large wavelength does not propagate to the electric-charge transfer section for transferring the electric charge of the light beam with the large wavelength. For this reason, the first solid-state image pickup device does not raise a smear problem caused by mixing of a noise signal with signal electric charge in transferring the electric charge of an electric beam having a large wavelength.

A second solid-state image pickup device provided by the present invention is a solid-state image pickup device including photosensors and electric-charge transfer sections. The photosensors and the electric-charge transfer sections are provided in a layered structure. To be more specific, the photosensors include a first photosensor and a second photosensor for receiving a light beam having a wavelength smaller than the wavelength of a light beam received by the first photosensor. The first and second photosensors are provided at adjacent locations separated away from each other by a potential barrier section. Below the first photosensor, a first electric-charge transfer section is provided. In a side portion of the first photosensor, a first read gate is provided as a gate for transporting electric charge generated as a result of a photoelectric conversion process carried out by the first photosensor to the first electric-charge transfer section. By the same token, below the second photosensor, a second electric-charge transfer section is provided and, in a side portion of the second photosensor, a second read gate is provided as a gate for transporting electric charge generated as a result of a photoelectric-conversion process carried out by the second photosensor to the second electric-charge transfer section. A transfer gate is provided between the first electric-charge transfer section and the second electric-charge transfer section as a gate for transporting electric charge accumulated in the first electric-charge transfer section to the second electric-charge transfer section.

To put it in detail, in the second solid-state image pickup device cited above, the first photosensor for receiving only a light beam having a large wavelength converts the light beam having a large wavelength into a signal electric charge in a photoelectric conversion process. Then, the first read gate transports the signal electric charge to the first electric-charge transfer section for accumulating the electric charge. With a predetermined timing, the transfer gate transports the electric charge from the first electric-charge transfer section to the second electric-charge transfer section provided below the second photosensor for receiving only a light beam having a small wavelength. The second electric-charge transfer section then transports the electric charge to a final stage. An example of a light beam having a large wavelength is a red-color or green-color light beam and an example of a light beam having a small wavelength is a blue-color light beam. On the other hand, the second photosensor for receiving only a light beam having a wavelength smaller than the light beam received by the first photosensor converts the light beam having a small wavelength into a signal electric charge. With a timing of the second electric-charge transfer section transferring no electric charge, the second read gate transports the signal electric charge to the second electric-charge transfer section, which then transports the electric charge to typically the final stage. Thus, under the first photosensor for receiving a light beam having a large wavelength, no signal electric charge of the light beam having a large wavelength is transferred. As a result, even if a large-wavelength light beam such as a red-color (or green-color) light penetrates the first photosensor as is the case with the conventional solid-state image pickup device, entering a space beneath the first photosensor, the light beam with the large wavelength does not propagate to the electric-charge transfer section. For this reason, the second solid-state image pickup device does not raise a smear problem caused by mixing of a noise signal with a signal electric charge being transferred.

A first electric-charge transfer-method provided by the present invention is provided for a solid-state image pickup device including a first photosensor and a second photosensor for receiving a light beam having a wavelength smaller than the wavelength of a light beam received by the first photosensor. The first and second photosensors are provided at adjacent locations separated away from each other by a potential barrier section. Below the first photosensor, a read gate is provided as a gate for transporting electric charge generated by the first photosensor to an electric-charge transfer section provided beneath the second photosensor. In accordance with the first electric-charge transfer method, the read gate transports an electric charge generated as a result of a photoelectric conversion process carried out in the first photosensor to the electric-charge transfer section, which further transfers the electric charge.

To put it in detail, in accordance with the first electric-charge transfer method described above, the first photosensor for receiving only a light beam having a large wavelength converts the light beam having a large wavelength into an electric charge in a photoelectric conversion process. The read gate transports the electric charge to the electric-charge transfer section provided below the second photosensor for receiving a light beam having a wavelength smaller than the wavelength of a light beam received by the first photosensor. The electric-charge transfer section further transfers the electric charge transported by the read gate thereto. An example of a light beam having a large wavelength is a red-color or green-color light beam. Thus, under the first photosensor for receiving a light beam having a large wavelength, no electric charge of the light beam having a large wavelength is transferred. As a result, even if a large-wavelength light beam such as a red-color light penetrates the first photosensor as is the case with the conventional solid-state image pickup device, entering a space beneath the first photosensor, the light beam with the large wavelength does not propagate to the electric-charge transfer section for transferring the electric charge of the light beam with the large wavelength. For this reason, the first electric-charge transfer method does not raise a smear problem caused by mixing of a noise signal with electric charge in transferring the electric charge of an electric beam having a large wavelength.

A second electric-charge transfer method provided by the present invention is provided for a solid-state image pickup device including a first photosensor and a second photosensor for receiving a light beam having a wavelength smaller than the wavelength of a light beam received by the first photosensor. The first and second photosensors are provided at adjacent locations separated away from each other by a potential barrier section. The solid-state image pickup device also includes a first electric-charge transfer section provided below the first photosensor and a first read gate provided in a side portion of the first photosensor as a gate for transporting electric charge generated as a result of a photoelectric conversion process carried out by the first photosensor to the first electric-charge transfer section. In addition, the solid-state image pickup device also has a second electric-charge transfer section provided below the second photosensor and a second read gate provided in a side portion of the second photosensor as a gate for transporting electric charge generated as a result of a photoelectric conversion process carried out by the second photosensor to the second electric-charge transfer section. The solid-state image pickup device further includes a transfer gate provided between the first electric-charge transfer section and the second electric-charge transfer section as a gate for transporting electric charge accumulated in the first electric-charge transfer section to the second electric-charge transfer section. In accordance with the second electric-charge transfer method, the first read gate transports an electric charge generated as a result of a photoelectric conversion process carried out in the first photosensor to the first electric-charge transfer section. Furthermore, the transfer gate transports the electric charge to the second electric-charge transfer section, which further transfers the electric charge.

To put in detail, in accordance with the second electric-charge transfer method described above, the first photosensor for receiving only a light beam having a large wavelength converts the light beam having a large wavelength into a signal electric charge in a photoelectric conversion process. Then, the first read gate transports the signal electric charge to the first electric-charge transfer section for accumulating the electric charge. With a predetermined timing, the transfer gate transports the electric charge from the first electric-charge transfer section to the second electric-charge transfer section. The second electric-charge transfer section then transports the electric charge to a final stage. An example of a light beam having a large wavelength is a red-color or green-color light beam. On the other hand, the second photosensor for receiving only a light beam having a wavelength smaller than the light beam received by the first photosensor converts the light beam having a small wavelength into a signal electric charge. With a timing of the second electric-charge transfer section transferring no electric charge, the second read gate transports the signal electric charge to the second electric-charge transfer section, which then transports the electric charge to typically the final stage. Thus, under the first photosensor for receiving a light beam having a large wavelength, no signal electric charge of the light beam having a large wavelength is transferred. As a result, even if a large-wavelength light beam such as a red-color (or green-color) light penetrates the first photosensor as is the case with the conventional solid-state image pickup device, entering a space beneath the first photosensor, the light beam with the large wavelength does not propagate to the electric-charge transfer section. For this reason, the second electric-charge transfer method does not raise a smear problem caused by mixing of a noise signal with a signal electric charge being transferred.

BRIEF DESCRIPTION OF DRAWINGS

FIG. 1A is a diagram showing a top-view layout whereas FIG. 1B is a diagram showing a schematic cross section of a configuration;

FIG. 2A is a diagram showing a top-view layout whereas FIG. 2B is a diagram showing a schematic cross section of a configuration;

FIG. 5A is a diagram showing a top-view layout whereas FIG. 5B is a diagram showing a schematic cross section of a configuration;

BEST MODES FOR CARRYING OUT THE INVENTION

Figure 1A:
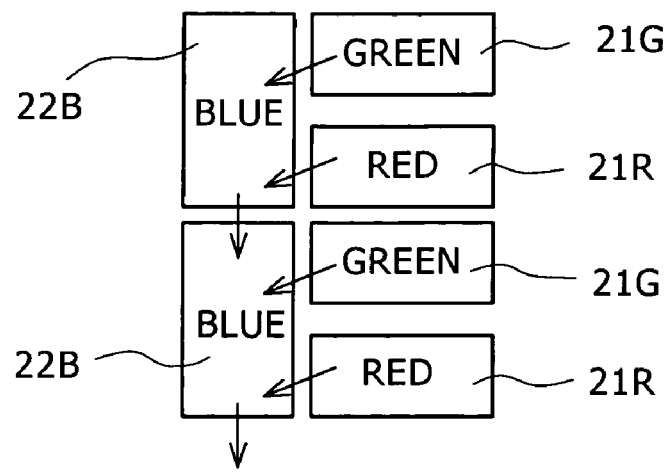
FIGS. 1A and 1B are diagrams showing embodiments implementing a first solid-state image pickup device and its first electric-charge transfer method, which are provided by the present invention and, to be more specific.
Figure 1B:
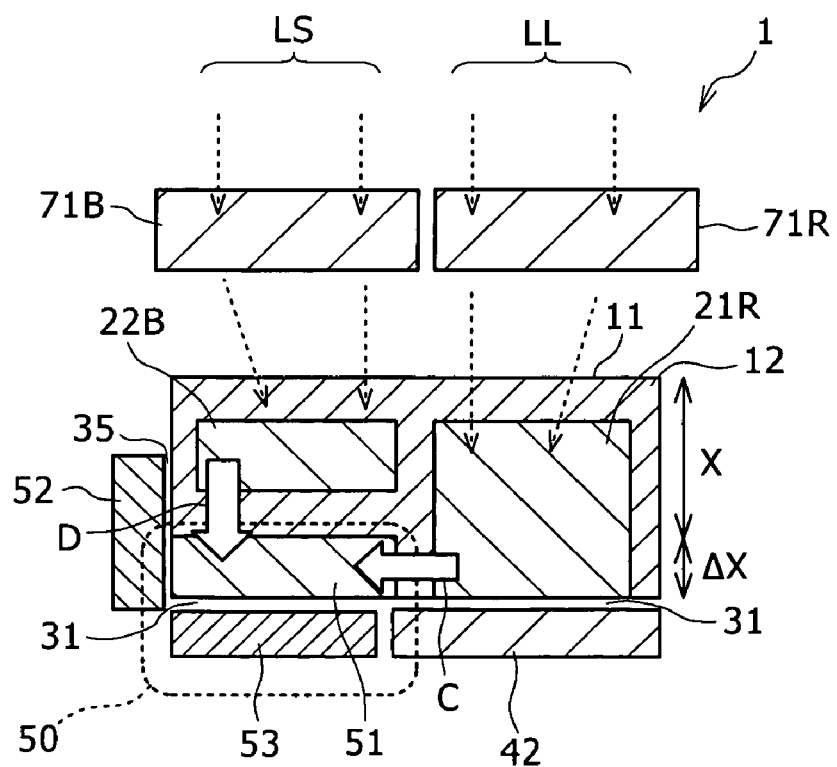

By referring to FIG. 1A showing a top-view layout and FIG. 1B showing a schematic cross section of a configuration, the following description explains embodiments implementing a first solid-state image-pickup device and its first electric-charge transfer method, which are provided by the present invention.

As shown in FIG. 1A, in a typical configuration of the solid-state image pickup device provided by the present invention, first photosensors 21 (red-color photosensors 21R) each used for receiving a red-color light beam and first photosensors 21 (green-color photosensors 21G) each used for receiving a green-color light beam are laid out alternately typically in the vertical transfer direction. In addition, a second photosensor 22 (a blue-color photosensor 22B) for receiving a blue-color light beam is provided at a location adjacent to each pair of a red-color photosensor 21R and a green-color photosensor 21G. Such blue-color photosensors 22B are laid out to form an array oriented typically also in the vertical transfer direction.

The basic configuration of an electric-charge transfer method adopted by the solid-state image pickup device described above is explained as follows. In accordance with the electric-charge transfer method provided by the present invention, a signal electric charge obtained as a result of a photoelectric conversion process carried out by the red-color electric-charge conversion section 21R (or the green-color photosensor 21G) for receiving a light beam having a large wavelength and carrying out the photoelectric conversion process on the received light beam is transported to an electric-charge transfer section (or a transfer CCD) provided under the blue-color photosensor 22B for carrying out a photoelectric conversion process to convert a light beam having a wavelength smaller than the wavelength of the red or green light beam, and the electric-charge transfer section (or a transfer CCD) provided under the blue-color photosensor 22B further transfers the signal electric charge to an amplifier not shown in the figure. Examples of the light beam having a large wavelength are a red-color light beam and, in some cases, a green-color light beam whereas an example of the light beam having a smaller wavelength is a blue-color light beam. The red-color, green-color and blue-color light beams are the RGB (R: red, G: green and B: blue) light beams cited before. Arrows shown in the figure each indicate a transport or transfer direction.

In a solid-state image pickup device, normally, the red-color light beam (and, in some cases, the green-color light beam) having a relatively large wavelength among the RGB (R: red, G: green and B: blue) light beams all but completely penetrates a photosensor made of a semiconductor layer. Thus, in the implementation of the basic configuration of the electric-charge transfer method provided for the solid-state image pickup device, the electric-charge transfer section is not provided under a first photosensor 21 (that is, the red-color photosensor 21R or the green-color photosensor 21G) for receiving a red-color light beam or, in some cases, a green-color light beam. Instead, a read gate is provided under the first photoelectric charge conversion section 21 (21R, 21G) for receiving a light beam having a large wavelength and carrying out a photoelectric conversion process on the received light beam as a gate for transporting a signal electric charge to an electric-charge transfer section (or a transfer CCD) provided beneath the second photosensor 22 (or a blue-color photosensor 22B) for carrying out a photoelectric conversion process on a light beam having a wavelength smaller than the wavelength of the light beam. The read gate transports the signal electric charge generated as a result of the photoelectric conversion process carried out by the first photosensor 21R (or 21G) to the electric-charge transfer section, which then further transfers the signal electric charge to an amplifier not shown in the figure. Examples of the light beam having a large wavelength are a red-color light beam, whereas an example of the light beam having a smaller wavelength is a blue-color light beam.

The above electric-charge transportation and transfer operations can be carried out because a light beam having a small wavelength as is the case with the blue-color light beam is all but completely subjected to a photoelectric conversion process on the surface of a semiconductor so that no such light beam reaches the electric-charge transfer section (or a transfer CCD) provided beneath the second photosensor 22 to be converted into an electric charge in the electric-charge transfer section and, hence, no electric charge is generated in the electric-charge transfer section. Thus, the signal electric charge obtained as a result of the photoelectric conversion process carried out on the red-color light beam flows through the electric-charge transfer section provided beneath the second photosensor 22 for receiving a light beam having a small wavelength (the blue color) in a transfer to the amplifier not shown in the figure. As a result, the red-color light beam can be prevented from penetrating the photoelectric conversion section and hitting the electric-charge transfer section to raise a smear problem caused by mixing of a noise signal with signal electric charge being transferred.

By referring to a schematically cross-sectional configuration diagram of FIG. 1B, the following description explains the configuration of an embodiment implementing the first solid-state image pickup device provided by the present invention as a device for realizing the first electric-charge transfer method also provided by the present invention. As an example, the configuration of the embodiment is explained for a red-color photosensor and a blue-color photosensor. It is to be noted that, by replacing the red-color photosensor with a green-color photosensor, the following explanation also holds true of an embodiment comprising a green-color photosensor and a blue-color photosensor.

As shown in FIG. 1B, the basic configuration of the solid-state image pickup device provided by the present invention includes a semiconductor layer 11. The semiconductor layer 11 has a first photosensor (or a red-color photosensor 21R) for receiving a light beam LL having a large wavelength as is the case with typically a red-color light beam and carrying out a photoelectric conversion process on the light beam LL as well as a second photosensor 22 (or a blue-color photosensor 22B) for receiving a light beam LS having a small wavelength as is the case with typically a blue-color light beam and carrying out a photoelectric conversion process on the light beam LS. The first photosensor and the second photosensor 22 are provided at adjacent locations separated away from each other by a potential barrier section 12. The semiconductor layer 11 is typically made of an SOI (Silicon On Insulator) layer. A red-color filter 71R is provided on the red-color photosensor 21R while a green-color filter is provided on a green-color photosensor, which is not shown in the figure. On the other hand, a blue-color filter 71B is provided on the blue-color photosensor 22B.

As shown in the top-view layout diagram of FIG. 1A, for example, first photosensors 21 (or red-color photosensors 21R) each used for receiving a red-color light beam and first photosensors 21 (or green-color photosensors 21G) each used for receiving a green-color light beam are laid out alternately typically in the vertical transfer direction. In addition, a second photosensor 22 (or a blue-color photosensor 22B) for receiving a blue-color light beam is provided at a location adjacent to each pair of a red-color photosensor 21R and a green-color photosensor 21G. Such-blue-color photosensors 22B are laid out to form an array oriented in the vertical transfer direction.

The following description is focused on the red-color photosensor 21R and the blue-color photosensor 22B. The red-color photosensor 21R is provided deeply to the bottom (a depth level of $(X+\Delta X)$) of the semiconductor layer 11. Over the semiconductor layer 11, the blue-color photosensor 22B is provided at a location adjacent to the red-color photosensor 21R, being separated away from the red-color photosensor 21R by the potential barrier section 12. Within the semiconductor layer 11 beneath the blue-color photosensor 22B, a channel area 51 of the electric-charge transfer section is provided in a space with a thickness of $\Delta X$ between a depth level of X and the bottom of the semiconductor layer 11, being separated away from the blue-color photosensor 22B by the potential barrier section 12. Beneath an insulation film (or a gate insulation film) 31 under the semiconductor layer 11, a read gate 42 is provided at a location below the red-color photosensor 21R and a transfer gate 53 is provided at a location below the blue-color photosensor 22B. As shown in none of the figures, a photosensor for receiving a green-color light beam can be provided in the same configuration as the aforementioned red-color photosensor 21R for receiving a red-color light beam. In addition, in a side portion of the blue-color photosensor 22B, a vertically oriented read gate 52 for reading out a blue-color light beam is provided, being separated away from the blue-color photosensor 22B by the potential barrier section 12 and a gate insulation film 35.

In the configuration described above, the read gate 42 exists right under the red-color photosensor 21R for receiving a red-color light beam (or the green-color photosensor 21G for receiving a green-color light beam), being separated away from the red-color photosensor 21R or the green-color photosensor 21G by the gate insulation film 31 and no electric-charge transfer section (transfer CCD) is present under the red-color photosensor 21R. In the red-color photosensor 21R (or the green-color photosensor 21G), a photoelectric conversion area is extended to the bottom of the semiconductor layer 11. Thus, the read gate 42 existing in an embedded oxide film not shown in the figure transports a signal electric charge obtained as a result of a photoelectric conversion process carried out by the red-color photosensor 21R receiving a red-color light beam (or the green-color photosensor 21G receiving a green-color light beam) on the light beam to the electric-charge transfer section (or the transfer CCD) 50 provided below the blue-color photosensor 22B in a direction indicated by an arrow C shown in the figure. Then, the electric-charge transfer section 50 further transfers this signal electric charge to, for example, the last stage.

On the other hand, the vertically oriented read gate 52 on the left edge of the blue-color photosensor 22B for receiving a blue-color light beam transports a signal electric charge generated in the blue-color photosensor 22B to the electric-charge transfer section (or the transfer CCD) 50 in a direction indicated by an arrow D shown in the figure. Then, the electric-charge transfer section 50 further transfers this signal electric charge to, for example, the last stage.

Figure 2A:
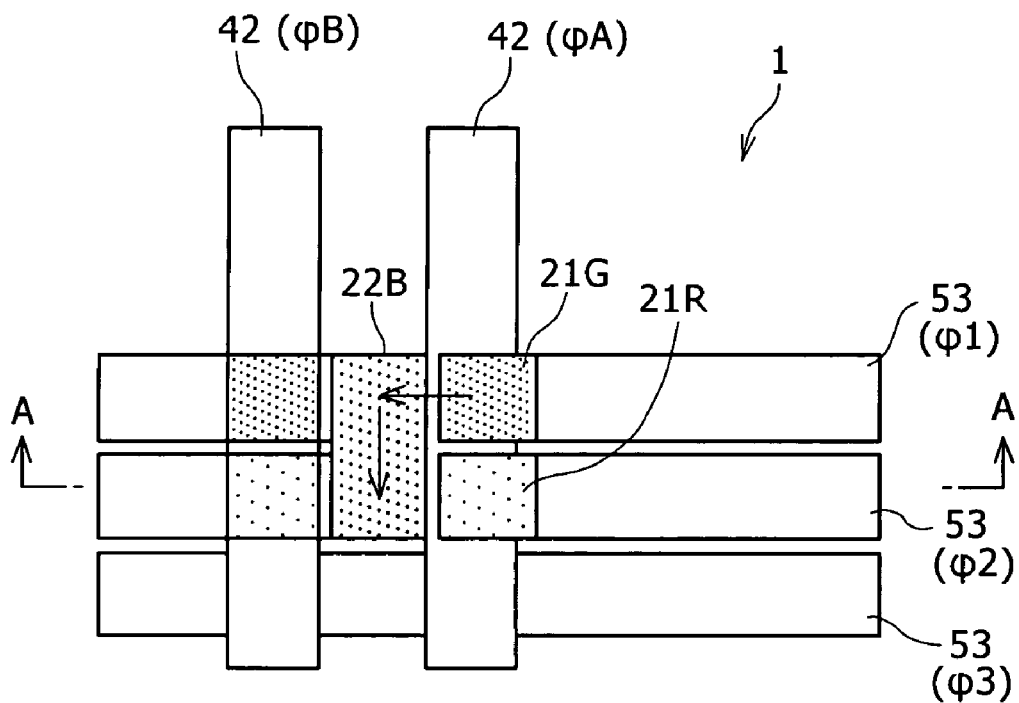
FIGS. 2A and 2B are diagrams showing a transfer gate electrode and read gate electrode of the first solid-state image pickup device and, to be more specific.
Figure 2B:
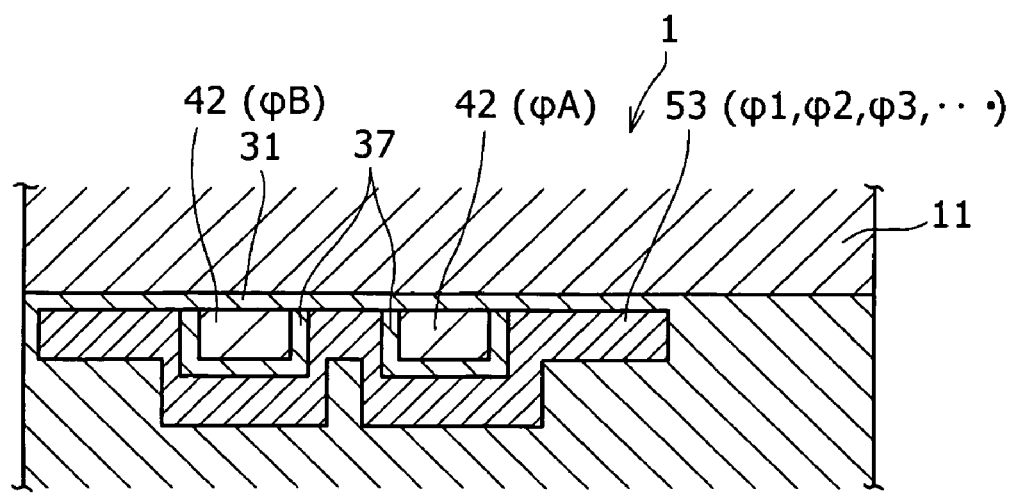

Next, the transfer gate electrode and read gate electrode of the first solid-state image pickup device are described in detail by referring to FIG. 2A showing a top-view layout and FIG. 2B showing a schematic cross section of a configuration. It is to be noted that FIG. 2B is a diagram mainly showing an A-A cross section of the gate electrode shown in FIG. 2A.

As shown in FIGS. 2A and 2B, on the semiconductor layer 11, which is typically an SOI layer, a red-color photosensor 21R, a green-color photosensor 21G and a blue-color photosensor 22B for receiving light beams of the RGB colors respectively are laid out at locations separated away from each other by a potential barrier section not shown in the figure. That is to say, red-color photosensors 21R and green-color photosensors 21G are laid out alternately typically in the vertical transfer direction. In addition, a blue-color photosensor 22B is provided at a location adjacent to each pair of a red-color photosensor 21R and a green-color photosensor 21G, being separated away from the pair in the horizontal transfer direction. Beneath the semiconductor layer 11 in which the red-color photosensor 21R and the green-color photosensor 21G are provided, read gates 42 (φA, φB and so on) extended in the vertical transfer direction are each provided, being separated away from the semiconductor layer 11 by an insulation film such as a gate insulation film as a gate capable of reading a signal electric charge from the red-color photosensor 21R and the green-color photosensor 21G and transporting the signal electric charge to the electric-charge transfer section (or the transfer CCD). For the read gates 42, transfer gates 53 (φ1, φ2 and so on) are laid out in the horizontal transfer direction perpendicular to the read gates φA, φB and so on. Below the blue-color photosensor 22B, the transfer gates φ1, φ2 and so on are laid out continuously, being separated away from the blue-color photosensor 22B by the gate insulation film 31. Below the read gates φA, φB and so on at the red-color photosensor 21R and the green-color photosensor 21G, on the other hand, the transfer gates φ1, φ2 and so on are laid out continuously, being separated away from the red-color photosensor 21R and the green-color photosensor 21G by an insulation film 37.

A typical operation to read out signal electric charge in the solid-state image pickup device 1 including the configuration described above is explained as follows. By laying out the transfer gates φ1, φ2 and so on perpendicularly to the read gates φA, φB and so on, an operation to read out a signal electric charge for the blue color can be carried out. The electric-charge transfer section (or the transfer CCD) provided below the blue-color photosensor 22B carries out a transfer operation by changing a voltage applied to the transfer gates φ1, φ2 and so on laid out in the horizontal direction. Right below the semiconductor layer 11 (typically an SOI layer) in which the red-color photosensor 21R and the green-color photosensor 21G are provided, the read gates φA, φB and so on are provided whereas the transfer gates φ1, φ2 and so on are laid out through the read gates φA, φB and so on. Thus, large-wavelength light beams such as light beams of the green and red colors are not affected.

Next, a typical operation to read out signal electric charge in the first solid-state image pickup device including the configuration described above is explained by referring to timing charts shown in FIG. 3 as follows.

Figure 3:
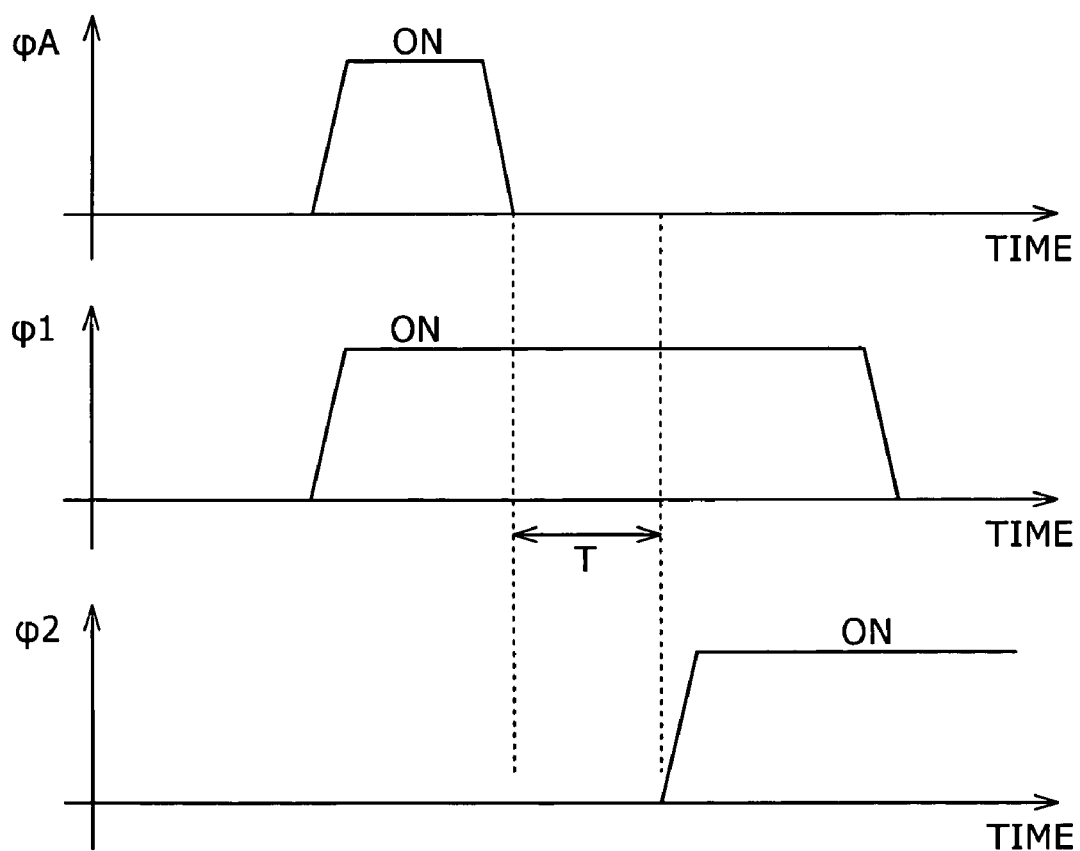
FIG. 3 shows timing charts of typical read operations carried out by the solid-state image pickup device.

As shown in FIG. 3, the read gate φA is turned on. Then, in order to read out a green-color signal, for example, the transfer gates φ1 and φ3 and so on not shown in the figure are also turned on. Thus, the read gate φA transports a green-color signal obtained as a result of a photoelectric conversion process carried out by the green-color photosensor to the electric-charge transfer sections of the transfer gates φ1 and φ3 and so on and, then, the transfer gates φ1 and φ3 and so on not shown in the figure further transfer the green-color signal to an amplifier also not shown in the figure. A red-color signal is read out after a predetermined necessary period T has lapsed since the operation to read out the green-color signal to prevent the red-color signal from being included in the green-color signal. To put it concretely, when the transfer gates φ2 and φ4 and so on not shown in the figure are also turned on, the read gate φA transports the red-color signal obtained as a result of a photoelectric conversion process carried out by the red-color photosensor to the electric-charge transfer sections of the transfer gates φ2 and φ4 and so on not shown in the figure and, then, the transfer gates φ2 and φ4 and so on further transfer the red-color signal to an amplifier not shown in the figure.

Figure 4:
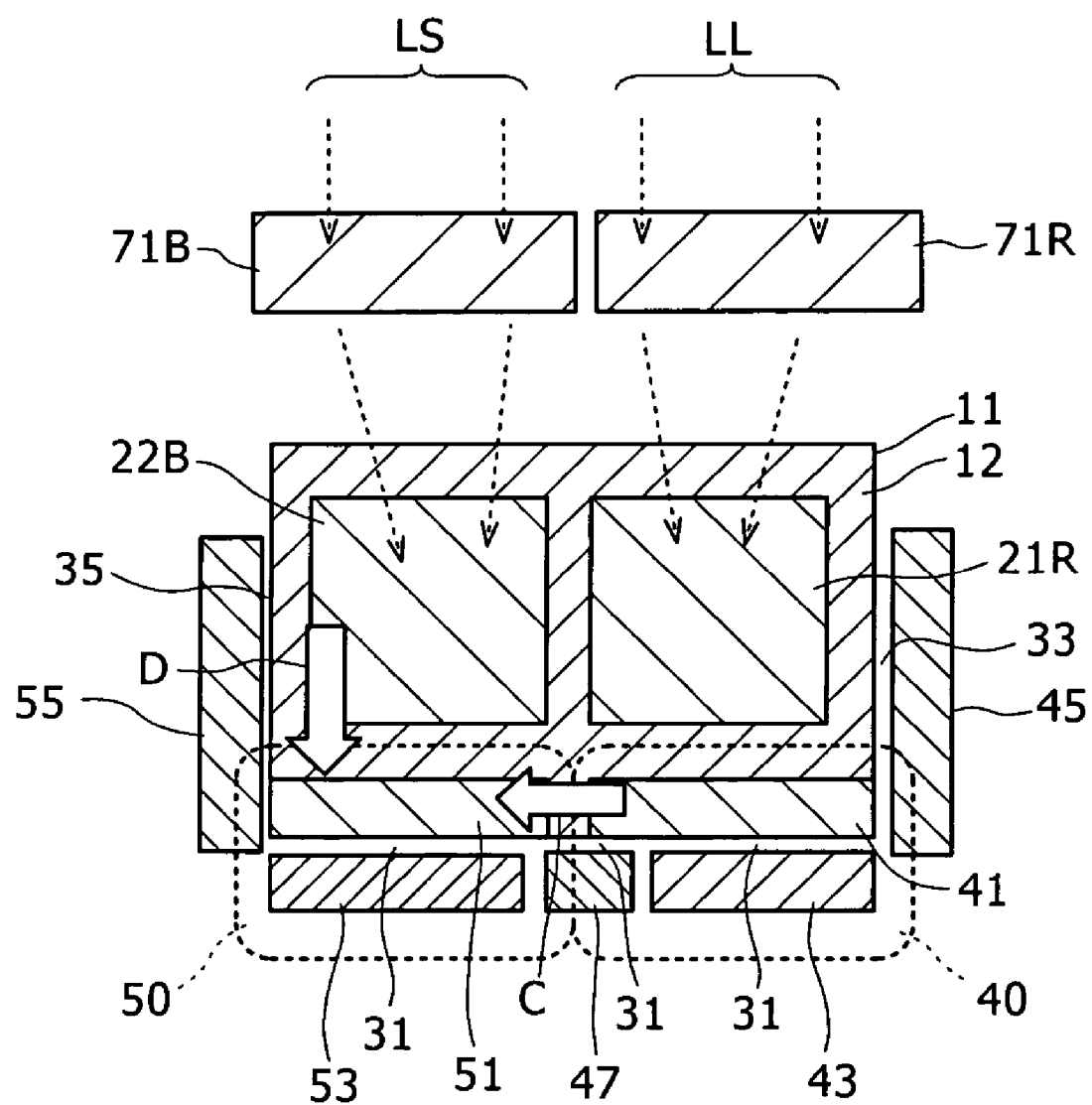
FIG. 4 is a diagram showing a schematic cross section of a configuration of embodiments implementing a second solid-state image pickup device and its second electric-charge transfer method, which are provided by the present invention.

By referring to FIG. 4 showing a schematic cross section of a configuration of embodiments implementing a second solid-state image pickup device and a second electric-charge transfer method, which are provided by the present invention, the following description explains the embodiments. The typical configuration shown in FIG. 4 is different from the typical configuration shown in FIG. 1B in that, in the configuration shown in FIG. 4, a transfer CCD is provided beneath a photoelectric conversion device for the red color (or the blue color). As an example, FIG. 4 is given as an explanatory diagram showing a red-color photosensor and a blue-color photosensor.

As shown in FIG. 4, the basic configuration of the second solid-state image pickup device provided by the present invention includes a semiconductor layer 11. The semiconductor layer 11 has a first photosensor 21 (a red-color photosensor 21R) for receiving a light beam LL having a large wavelength as is the case with typically a red-color light beam and carrying out a photoelectric conversion process on the light beam LL as well as a second photosensor 22 (a blue-color photosensor 22B) for receiving a light beam LS having a small wavelength as is the case with typically a blue-color light beam and carrying out a photoelectric conversion process on the light beam LS. The first photosensor 21 and the second photosensor 22 are provided at adjacent locations separated away from each other by a potential barrier section 12. The semiconductor layer 11 is typically made of an SOI (Silicon On Insulator) layer. A red-color filter 71R is provided on the red-color photosensor 21R while a green-color filter is provided on a green-color photosensor, which is not shown in the figure. On the other hand, a blue-color filter 71B is provided on the blue-color photosensor 22B.

As shown in the top-view layout diagram of FIG. 1A, for example, first photosensors 21 (or red-color photosensors 21R) each used for receiving a red-color light beam and first photosensors 21 (or green-color photosensors 21G) each used for receiving a green-color light beam are laid out alternately typically in the vertical transfer direction. In addition, a second photosensor 22 (or a blue-color photosensor 22B) for receiving a blue-color light beam is provided at a location adjacent to each pair of a red-color photosensor 21R and a green-color photosensor 21G. Such blue-color photosensors 22B are laid out to form an array oriented in the vertical transfer direction.

The following description is focused on the red-color photosensor 21R and the blue-color photosensor 22B. The red-color photosensor 21R and the blue-color photosensor 22B are provided over the semiconductor layer 11 at locations separated away from each other by a potential barrier section 12. In addition, in the semiconductor layer 11 beneath the red-color photosensor 21R, a channel area 41 of an electric-charge hold/transfer section 40 is extended to the bottom of the semiconductor layer 11, being separated away from the red-color photosensor 21R by the potential barrier section 12. Furthermore, in the semiconductor layer 11 beneath the blue-color photosensor 22B, a channel area 51 of an electric-charge transfer section is extended to the bottom of the semiconductor layer 11, being separated away from the blue-color photosensor 22B by the potential barrier section 12. The channel areas 41 and 51 are also separated away from each other by the potential barrier section 12.

In a side portion of the red-color photosensor 21R, a vertically oriented first read gate 45 for reading out a red-color light beam is provided, being separated away from the red-color photosensor 21R by the potential barrier section 12 and a gate insulation film 33. On the other hand, in a side portion of the blue-color photosensor 22B, a vertically oriented second read gate 55 for reading out a blue-color light beam is provided, being separated away from the blue-color photosensor 22B by the potential barrier section 12 and a gate insulation film 35.

Beneath a gate insulation film 31 under the semiconductor layer 11, a hold gate 43 is provided at a location below the red-color photosensor 21R and a transfer gate 53 is provided at a location below the blue-color photosensor 22B. In addition, a transfer gate 47 is provided between the hold gate 43 and the transfer gate 53 as a gate for transferring electric charge from the electric-charge hold/transfer section 40 to the electric-charge transfer section 50. As shown in none of the figures, a photosensor for receiving a green-color light beam and its electric-charge hold/transfer section can be provided in the same configuration as the aforementioned red-color photosensor 21R for receiving a red-color light beam and the electric-charge hold/transfer section 40.

As explained above, in the configuration, the electric-charge hold/transfer section 40 (comprising the channel area 41, the gate insulation film 31 and the hold gate 43) exists beneath the red-color photosensor 21R for receiving a red-color light beam (or the green-color photosensor 21G for receiving a green-color light beam), being separated away from the red-color photosensor 21R (or the green-color photosensor 21G) by the potential barrier section 12. However, the electric-charge transfer section (or the transfer CCD) for transferring electric charge in the vertical direction does not exist beneath the red-color photosensor 21R (or the green-color photosensor 21G). Thus, the first read gate 45 transports a red-color signal (or a green-color signal) generated in a photoelectric conversion process carried out by the red-color photosensor 21R for receiving a red-color light beam (or the green-color photosensor 21G for receiving a green-color light beam) to the electric-charge hold/transfer section 40 for temporarily accumulating the signal transported thereto. With a predetermined timing, the transfer gate 47 transports the signal electric charge accumulated in the electric-charge hold/transfer section 40 from the electric-charge hold/transfer section 40 in a direction indicated by an arrow C shown in the figure to the electric-charge transfer section 50 (comprising the channel area 51, the gate insulation film 31 and the transfer gate 53). The electric-charge transfer section 50 further transfers the signal electric charge typically to the final stage.

On the other hand, the second read gate 55 on the left edge of the blue-color photosensor 22B for receiving a blue-color light beam transports a signal electric charge generated by the blue-color photosensor 22B to the electric-charge transfer section 50 in a direction indicated by an arrow D shown in the figure. The electric-charge transfer section 50 further transfers the signal electric charge typically to the final stage.

Figure 5A:
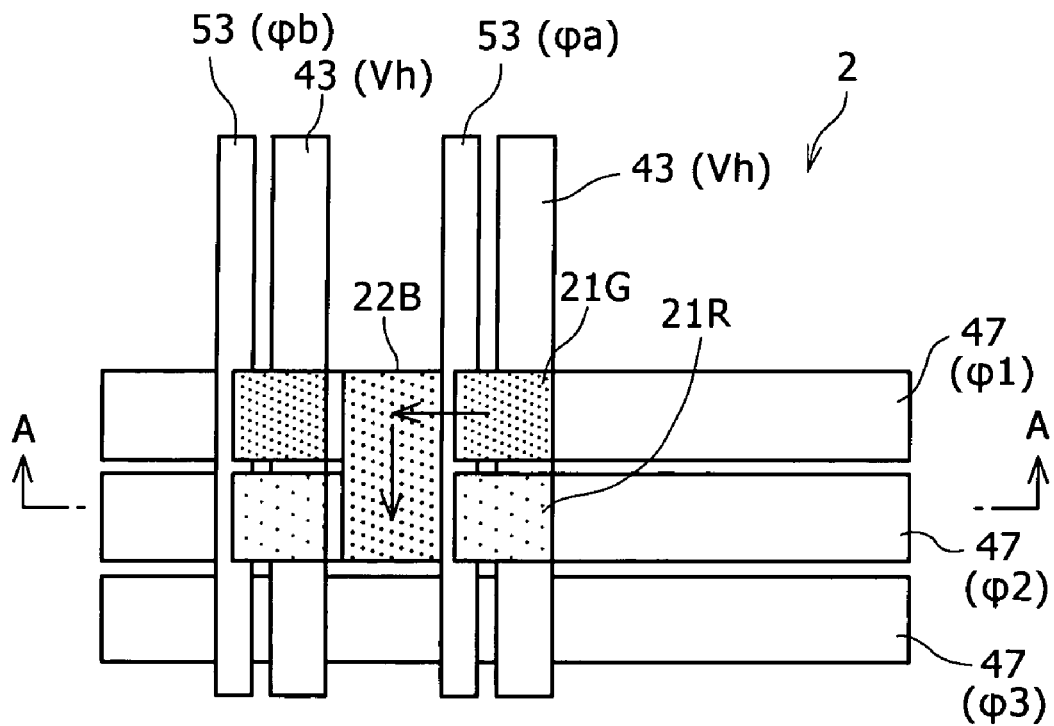
FIGS. 5A and 5B are diagrams showing a transfer gate electrode and read gate electrode of the second solid-state image pickup device and, to be more specific.
Figure 5B:
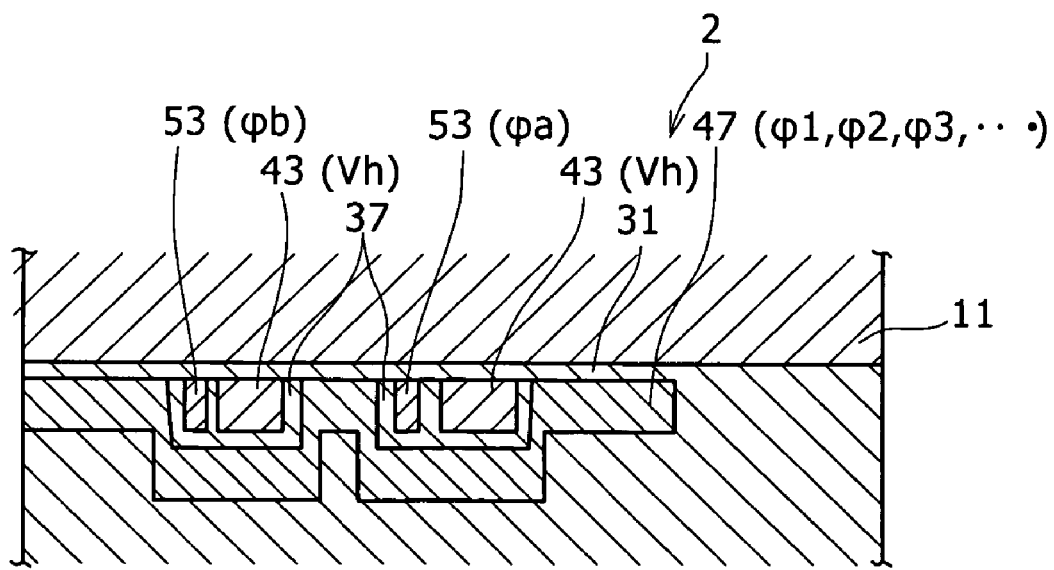

Next, the transfer gate electrode and read gate electrode of the second solid-state image pickup device are explained in detail by referring to FIG. 5A showing a top-view layout and FIG. 5B showing a schematic cross section of a configuration. It is to be noted that FIG. 5B is a diagram mainly showing an A-A cross section of the gate electrode shown in FIG. 5A.

As shown in FIGS. 5A and 5B, on the semiconductor layer 11, which is typically an SOI layer, a red-color photosensor 21R, a green-color photosensor 21G and a blue-color photosensor 22B for receiving light beams of the RGB colors respectively are laid out at locations separated away from each other by a potential barrier section not shown in the figure. That is to say, red-color photosensors 21R and green-color photosensors 21G are laid out alternately typically in the vertical transfer direction. In addition, a blue-color photosensor 22B is provided at a location adjacent to each pair of a red-color photosensor 21R and a green-color photosensor 21G, being separated away from the pair in the horizontal transfer direction.

Beneath the semiconductor layer 11 in which the red-color photosensor 21R and the green-color photosensor 21G are provided, a hold gate 43 (Vh) of the electric-charge hold/transfer section 40 for temporarily holding an electric charge read out from the red-color photosensor 21R and the green-color photosensor 21G is provided typically in the vertical transfer direction, being separated away from the semiconductor layer 11 by an insulation film such as the gate insulation film. In addition, beneath the semiconductor layer 11 at locations among the red-color photosensor 21R, the green-color photosensor 21G and the blue-color photosensor 22B, transfer gates 47 ($\phi a$, $\phi b$ and so on) are provided in parallel to the hold gates Vh, being separated away from the semiconductor layer 11 by an insulation film such as the gate insulation film. The transfer gates 47 ($\phi a$, $\phi b$ and so on) serve as gates for transferring electric charge from the electric-charge hold/transfer section 40 to the electric-charge transfer section 50 provided below the blue-color photosensor 22B. Furthermore, transfer gates 53 ($\phi 1$, $\phi 2$ and so on) are laid out in a horizontal transfer direction perpendicular to the hold gates Vh and the transfer gates $\phi a$, $\phi b$ and so on. The transfer gates 53 ($\phi 1$, $\phi 2$ and so on) serve as gates for transferring the electric charge typically to the final stage. Below the blue-color photosensor 22B, the transfer gates $\phi 1$, $\phi 2$ and so on are laid out continuously, being separated away from the blue-color photosensor 22B by the gate insulation film 31. At the red-color photosensor 21R and the green-color photosensor 21G, on the other hand, the transfer gates $\phi 1$, $\phi 2$ and so on are laid out continuously, being separated away from the red-color photosensor 21R and the green-color photosensor 21G by an insulation film 37 beneath the hold gates Vh and the transfer gates $\phi a$, $\phi b$ and so on.

A typical operation to read out signal electric charge in the solid-state image pickup device 2 including the configuration described above is explained as follows. By laying out the transfer gates $\phi 1$, $\phi 2$ and so on perpendicularly to the hold gates Vh, Vh and so on, an operation to read out a signal electric charge for the blue color can be carried out. The electric-charge transfer section (or the transfer CCD) 50 provided below the blue-color photosensor 22B carries out a transfer operation by changing a voltage applied to the transfer gates $\phi 1$, $\phi 2$ and so on laid out in the horizontal direction. Right below the semiconductor layer 11 (typically an SOI layer) in which the red-color photosensor 21R and the green-color photosensor 21G are provided, the hold gates Vh, Vh and so on as well as the transfer gates $\phi a$, $\phi b$ and so on are provided, whereas the transfer gates $\phi 1$, $\phi 2$ and so on are laid out through the hold gate Vh and the transfer gate $\phi a$, the hold gate Vh and the transfer gate $\phi b$ and so on. Thus, large-wavelength light beams such as light beams of the green and red colors are not affected.

Next, a typical operation to read out signal electric charge in the second solid-state image pickup device including the configuration described above is explained by referring to timing charts shown in FIG. 6 as follows.

Figure 6:
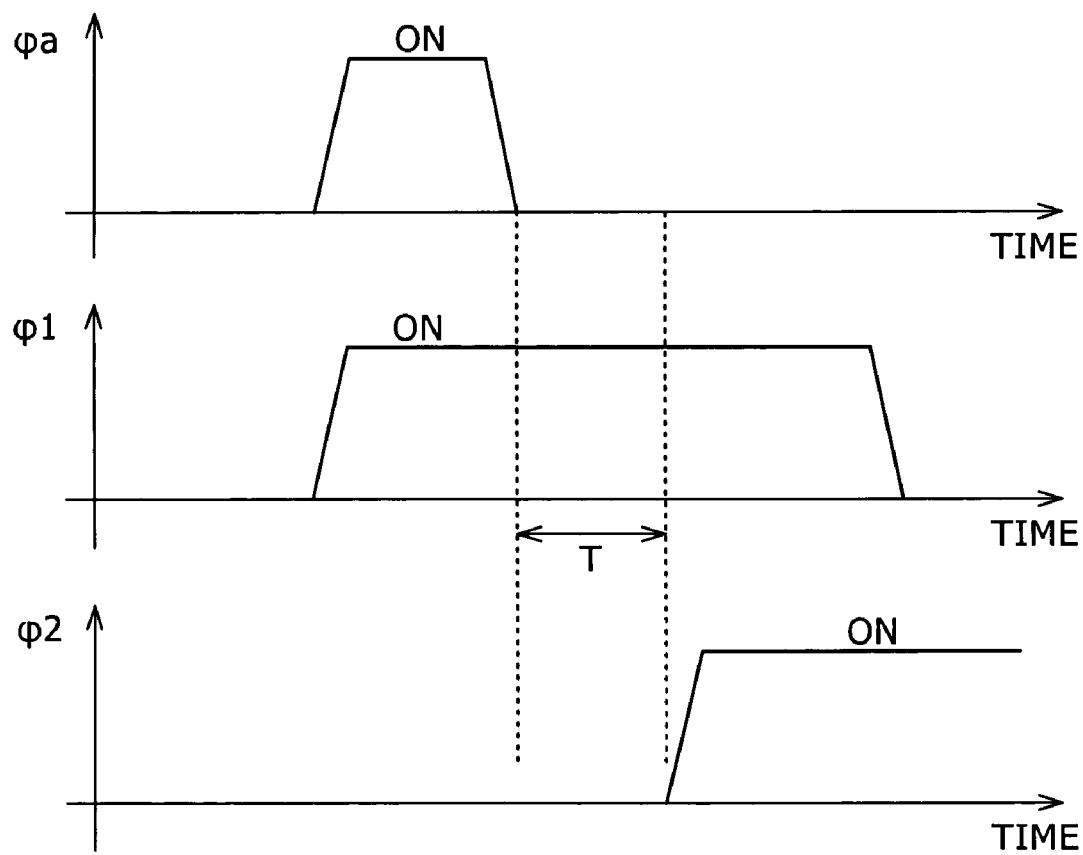
FIG. 6 shows timing charts of typical read operations carried out by the second solid-state image pickup device.

As shown in FIG. 6, the transfer gate $\phi a$ is turned on. Then, in order to read out a green-color signal, for example, the transfer gates $\phi 1$ and $\phi 3$ and so on not shown in the figure are also turned on. Thus, the transfer gates $\phi a$, $\phi b$ and so on each transport a green-color signal obtained as a result of a photoelectric conversion process carried out by the green-color photosensor and held in the electric-charge hold/transfer section to the electric-charge transfer sections of the transfer gates φ1, φ3 and so on not shown in the figure and, then, the transfer gates φ1, φ2, φ3 and so on not shown in the figure further transfer the green-color signal to an amplifier not shown in the figure. A red-color signal is read out after a predetermined necessary period T has lapsed since the operation to read out the green-color signal to prevent the red-color signal from being included in the green-color signal. In order to read out a red-color signal, the transfer gates φ2 and φ4 and so on not shown in the figure are turned on. Then, the transfer gate φa is turned on to transport a red-color signal obtained as a result of a photoelectric conversion process carried out by the red-color photosensor and held in the electric-charge hold/transfer section to the electric-charge transfer sections of the transfer gates φ2, φ4 and so on not shown in the figure and, then, the transfer gates φ1, φ2, φ3 and so on not shown in the figure further transfer the red-color signal to the amplifier not shown in the figure.

In the configuration of the embodiment described above, noise-signal electric charge is generated in the electric-charge transfer section (or the transfer CCD) due to smears. However, no noises enter the signal electric charge, which is flowing through the electric-charge transfer section 50 for the blue color, from the electric-charge hold/transfer section 40 for the red color (or the green color) adjacent to the electric-charge transfer section 50. Thus, the signal is not contaminated.

Figure 7A:
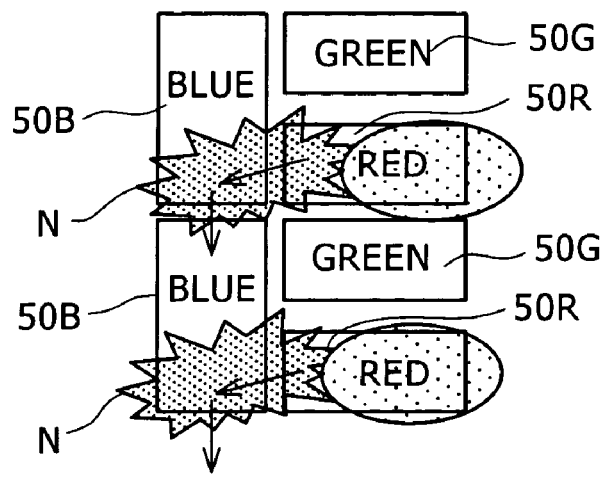
FIGS. 7A to 7C are diagrams showing a schematic top-view layout of the second electric-charge transfer method provided for a solid-state image pickup device in accordance with the present invention.
Figure 7B:
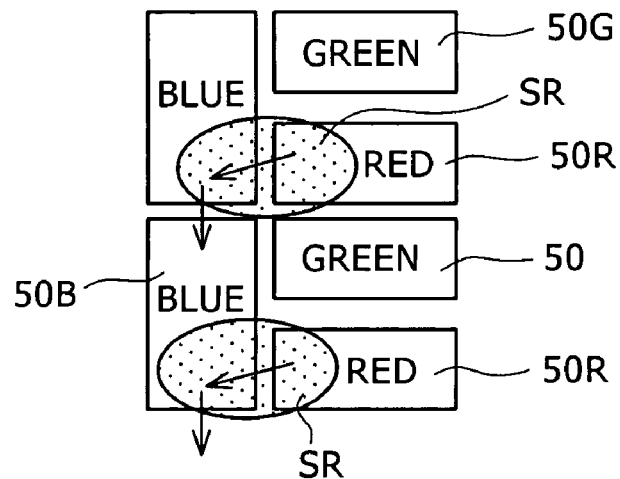
Figure 7C:
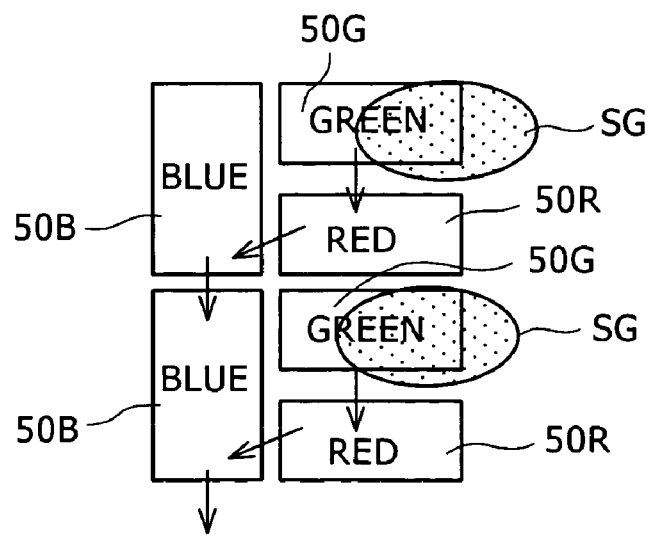

Next, another electric-charge transfer method adopted by the second solid-state image pickup device provided by the present invention is explained by referring to FIGS. 7A to 7C showing a schematic top-view layout of the electric-charge transfer method. It is to be noted that arrows shown in the figures each indicate the direction of a transfer of electric charge.

The following description explains a case in which a signal electric charge generated as a result of a photoelectric conversion process carried out by the red-color photosensor is not capable of reaching the electric-charge transfer section (or the transfer CCD) of the blue-color area unless the signal electric charge goes through the electric-charge transfer section provided beneath the red-color photosensor. In this case, prior to a process to read out the signal electric charge of the red color, a cleaning operation is carried out in order to remove noise electric charge of the electric-charge transfer section for the red color. That is to say, as shown in FIG. 7A, the noise-signal electric charge N is moved from the electric-charge transfer section (or the transfer CCD) 50R for the red color to the electric-charge transfer section (or the transfer CCD) 50B of the blue-color area. Then, the electric-charge transfer section (or the transfer CCD) 50B of the continuous blue-color area discards the noise-signal electric charge N to the final stage. Operations are carried out for the signal electric charge of the green color in the same way as the signal electric charge of the red color. That is to say, noise-signal electric charge N is moved from the electric-charge transfer section (or the transfer CCD) 50G for the green color to the electric-charge transfer section (or the transfer CCD) 50B of the blue-color area. Then, the electric-charge transfer section (or the transfer CCD) 50B of the continuous blue-color area discards the noise-signal electric charge N to the final stage.

Subsequently, as shown in FIG. 7B, after the noise-signal electric charge N is discarded, the read gate of the red color is turned on immediately and red-color signal electric charge SR is moved from the red-color photosensor to the electric-charge transfer section 50R for the red color. Then, the electric-charge transfer section 50R for the red color is turned on to move the red-color signal electric charge SR to the electric-charge transfer section (or the transfer CCD) 50B of the blue-color area. Subsequently, the electric-charge transfer section (or the transfer CCD) 50B of the continuous blue-color transfers the red-color signal electric charge SR. Operations are carried out for the signal electric charge of the green color in the same way as the signal electric charge of the red color. That is to say, after the noise-signal electric charge N is discarded, the read gate of the green color is turned on immediately and green-color signal electric charge is moved from the green-color photosensor to the electric-charge transfer section 50G for the green color. Then, the electric-charge transfer section 50G for the green color is turned on to move the green-color signal electric charge to the electric-charge transfer section (or the transfer CCD) 50B of the blue-color area. Subsequently, the electric-charge transfer section (or the transfer CCD) 50B of the continuous blue-color transfers the green-color signal electric charge.

It is to be noted that, if only signal electric charges of the red and green colors can be moved to the electric-charge transfer section 50B of the blue color, it is basically unnecessary to carry out the cleaning operation described above. This is because, since noises accumulated in the electric-charge transfer section 50R (or 50G) for the red color (or the green color) are also originally generated from a light beam of the red (or green) color from the beginning, it is nice to merely consider signal electric charge comprising an electric charge obtained as a result of a photoelectric conversion process carried out by the photosensor and additional noise electric charge accumulated in the electric-charge transfer section. Then, if this signal electric charge is sent to the electric-charge transfer section (or the transfer CCD) 50B for the blue color, the operations will become the same as those explained in the description of the first embodiment.

By the way, as shown in FIG. 7C, after a green-color light beam has been subjected to a photoelectric conversion process carried out by the green-color photosensor 50G to generate a green-color signal electric charge SG, for example, the green-color signal electric charge SG is sent to the electric-charge transfer section (or the transfer CCD) 50B for the blue color by way of the electric-charge transfer section (or the transfer CCD) 50R for the red color in the following order: the electric-charge transfer section (or the transfer CCD) 50G for the green color, the electric-charge transfer section (or the transfer CCD) 50R for the red color, the electric-charge transfer section (or the transfer CCD) 50B for the blue color, the electric-charge transfer section (or the transfer CCD) 50B for the blue color and so on. In this case, it is necessary to once carry out a cleaning operation to remove noise charge from the electric-charge transfer section 50R for the red color before sending the green-color signal electric charge SG. If the cleaning operation is not carried out, the green-color signal will be mixed with the red-color noise, getting contaminated.

As described above, when the electric-charge transfer section (or the transfer CCD) for the red (or green) color is used deliberately, before the signal electric charge for the red color is read out, a cleaning operation is carried out in order to remove noise charges from the electric-charge transfer section for the red color. That is to say, the noise-signal electric charge is moved from the electric-charge transfer section for the red color to the electric-charge transfer section for the blue color and, then, the red color to the electric-charge transfer section for the blue color discards the noise-signal electric charge to the final stage.

Figure 8A:
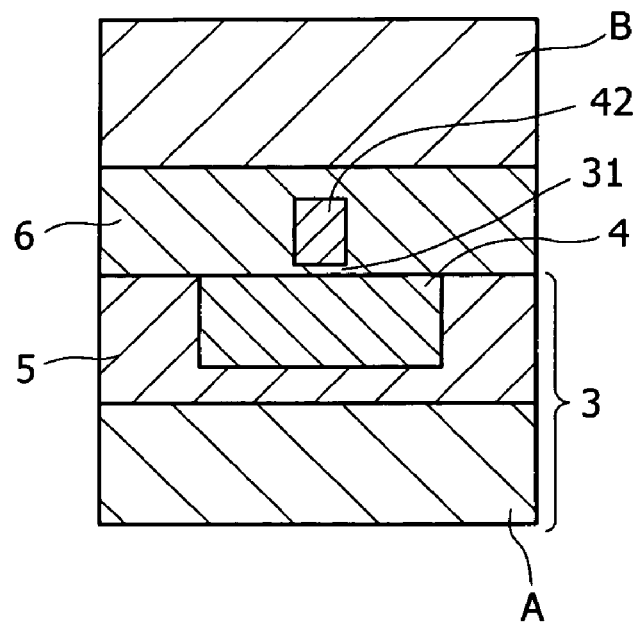
FIGS. 8A and 8B are diagrams showing schematic cross sections of a typical method to fabricate the first solid-state image pickup device.
Figure 8B:
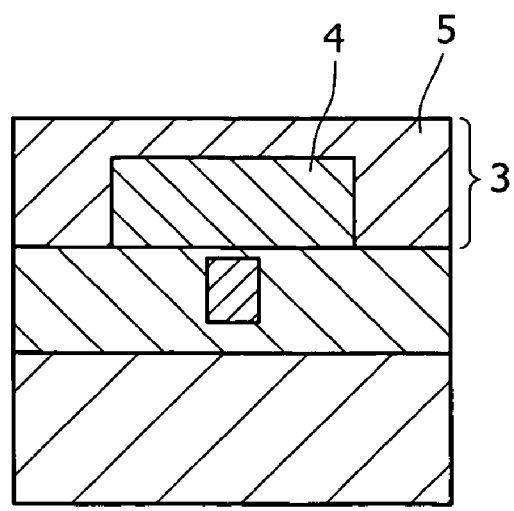
Figure 9A:
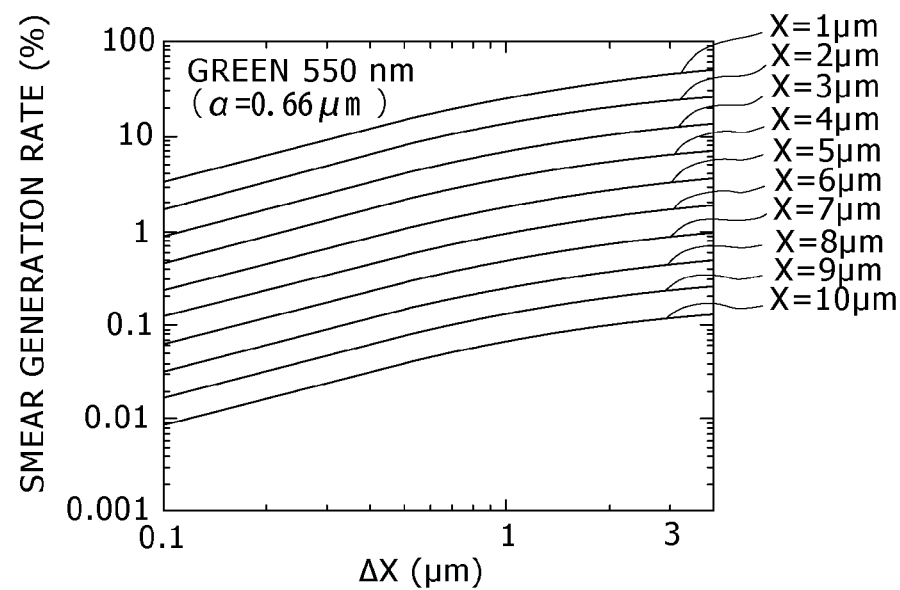
FIGS. 9A and 9B are diagrams each showing a relation between the depth of a semiconductor area of a transfer CCD and the generation rate of smears with the depth of a photosensor taken as a parameter.
Figure 9B:
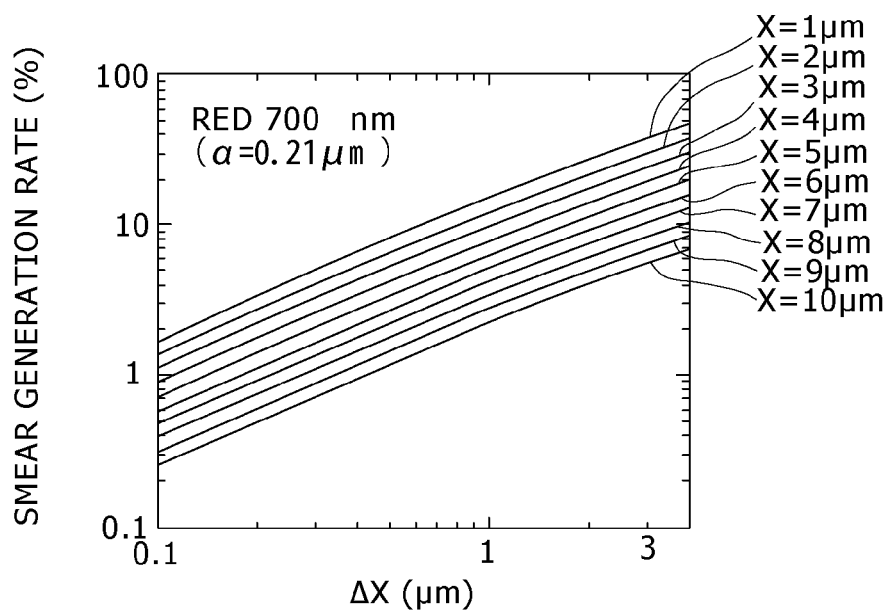

Next, a typical method of fabricating the first solid-state image pickup device is explained by referring to FIGS. 8A and 8B showing schematic cross sections of the method.

First of all, as shown in FIG. 8A, an SOI substrate 3 is prepared as substrate A, and an element separation area not shown in the figure is provided on its semiconductor layer (SOI layer) 4 by adopting a known element separation technology such as a trench element separation technology. In addition, if a bulk semiconductor substrate is used, for example, it is nice to create a trench element separation area to the depth corresponding to the film thickness of a desired SOI layer. It is to be noted that, if an SOI substrate is used and there is no need to create an element separation area, the element separation area is not provided.

Then, for the semiconductor layer 4, an ion injection method is typically adopted to create, among other things, an embedded channel (such as an n-type semiconductor area) for a transfer gate and a potential barrier section (such as a p-type channel stop area). These embedded channel and the potential barrier section are not shown in the figures.

Subsequently, by adoption of a known technology for creating a gate electrode, a read gate (or a read gate electrode) 42 is provided on the semiconductor layer 4, being separated away from the semiconductor layer 4 by a gate insulation film 31. In this process, first of all, the gate insulation film 31 is provided before a multi-crystal silicon film for the gate electrode is formed. Then, a lithography technology using an ordinary resist mask and an etching technology are adopted to create a read gate electrode 42G laid out in the vertical transfer direction. Subsequently, after unnecessary resist is removed, an insulation film covering the read gate electrode 42G is provided. Then, a multi-crystal silicon film for the transfer gate electrode is formed. Subsequently, the lithography technology using an ordinary resist mask and the etching technology are adopted to create a transfer gate electrode laid out in the horizontal transfer direction. The transfer gate electrode is not shown in the figure. Then, unnecessary resist is removed. In addition, if a vertically oriented read gate (or a vertically oriented read gate electrode) for reading out signal electric charge of the blue color is to be provided, prior to the formation of the gate electrode, a groove for laying out the vertically oriented read gate electrode is provided on the semiconductor layer 4. Afterwards, by embedding multi-crystal silicon in the groove, the vertically oriented read gate electrode for reading out signal electric charge of the blue color can be provided. The vertically oriented read gate electrode for reading out signal electric charge of the blue color is also not shown in the figure.

Thereafter, an inter-layer insulation film 6 for covering the gate electrodes is provided. Then, a CMP (Chemical Mechanical Polishing) technology is adopted to make the surface of the inter-layer insulation film 6 flat. The flattened surface is then stuck to other substrate B. Afterwards, an anneal process is carried out at a typical temperature of 1,000° C. for about 1 hour to implement a dehydrogenation binding process for firmly binding substrates A and B with each other.

Then, the back face of substrate A is ground. Later on, an etching process is carried out. The etching process is ended on the basis of a difference in etching rate between an embedded oxide film 5 of the SOI substrate 3 and the silicon of substrate A. By doing so, as shown in FIG. 8B, the embedded oxide film 5 of the SOI substrate 3 is exposed. Next, an ion injection process is carried out in order to obtain a desired distribution of impurities for the semiconductor layer 4.

Then, by adoption of a known technology for creating an on-chip lens and a known technology for creating an on-chip color filter, pixels are provided to satisfy specifications of the on-chip lens and the on-chip color filter. This process is not shown in the figure.

It is to be noted that a method of fabricating the second solid-state image pickup device is identical with the method of fabricating the first solid-state image pickup device. That is to say, in accordance with the method of fabricating the second solid-state image pickup device, in the process to create a read gate in accordance with the method of fabricating the first solid-state image pickup device, a hold gate and a transfer gate are also provided and, in the process to create a vertically oriented read gate in accordance with the method of fabricating the first solid-state image pickup device, a vertically oriented read gate for the second solid-state image pickup device is also provided. The rest of the method of fabricating the second solid-state image pickup device is the same as the other processes of the method of fabricating the first solid-state image pickup device.

As described above, in accordance with the first solid-state image pickup device provided by the present invention, a signal electric charge of a light beam having a large wavelength as is the case with a light beam of the red color (or the green color) can be transported to the electric-charge transfer section provided beneath the second photosensor for receiving a light beam having a small wavelength as is the case with a light beam of the blue color by virtue of the read gate provided beneath the first photosensor for receiving a light beam having a large wavelength. In accordance with the second solid-state image pickup device provided by the present invention, on the other hand, after accumulation of a signal electric charge of a light beam having a large wavelength as is the case with a light beam of the red color (or the green color), the signal electric charge can be transported to the electric-charge transfer section provided beneath the second photosensor for receiving a light beam having a small wavelength as is the case with a light beam of the blue color by virtue of the hold gate and the transfer gate, which are provided beneath the first photosensor for receiving a light beam having a large wavelength. Thus, even if a light beam having a large wavelength penetrates the first photosensor during an operation to transfer the signal electric charge of a light beam having a large wavelength in either of the solid-state image pickup devices as is the case with the conventional solid-state image pickup device, the transfer of the signal electric charge of a light beam having a large wavelength will no longer be affected. As a result, it is possible to solve to a smear problem caused by mixing of a noise signal with signal electric charge being transferred due to propagation of a light beam to the electric-charge transfer section.

In accordance with the first electric-charge transfer method provided for a solid-state image pickup device in accordance with the present invention, a signal electric charge of a light beam having a large wavelength as is the case with a light beam of the red color (or the green color) can be transported to the electric-charge transfer section provided beneath the second photosensor for receiving a light beam having a small wavelength as is the case with a light beam of the blue color by virtue of the read gate provided beneath the first photosensor for receiving a light beam having a large wavelength. In accordance with the second electric-charge transfer method provided for a solid-state image pickup device in accordance with the present invention, on the other hand, after accumulation of a signal electric charge of a light beam having a large wavelength as is the case with a light beam of the red color (or the green color), the signal electric charge can be transported to the electric-charge transfer section provided beneath the second photosensor for receiving a light beam having a small wavelength as is the case with a light beam of the blue color by virtue of the hold gate and the transfer gate, which are provided beneath the first photosensor for receiving a light beam having a large wavelength. Thus, even if a light beam having a large wavelength penetrates the first photosensor during an operation to transfer the signal electric charge of a light beam having a large wavelength by adoption of either of the electric-charge transfer methods as is the case with the conventional solid-state image pickup device, the transfer of the signal electric charge of a light beam having a large wavelength will no longer be affected. As a result, it is possible to solve to a smear problem caused by mixing of a noise signal with signal electric charge being transferred due to propagation of a light beam to the electric-charge transfer section.

The Invention claimed is:

1. A solid-state image pickup device comprising:
   a substrate with a light incident side and a non-light incident side facing away from said light incident side; and
   a photosensor section provided in said substrate, said photosensor section including a first photosensor particularly sensitive to light of a first wavelength and a second photosensor particularly sensitive to light of a second wavelength which is shorter than the first wavelength, wherein,
      said first photosensor extends toward said non-light incident side in a depth direction to an extent greater than does said second photosensor, and
      said first photosensor and said second photosensor do not overlap in the depth direction.

2. The solid-state image pickup device according to claim 1, wherein said first photosensor is particularly sensitive to a light beam of the red or green color and said second photosensor is particularly sensitive to a light beam of the blue color.

3. The solid-state image pickup device according to claim 1, wherein said first photosensor is particularly sensitive to a light beam of the red color and said second photosensor is particularly sensitive to a light beam of the green color.

4. The solid-state image pickup device according to claim 1, wherein said first photosensor and said second photosensor are provided at adjacent locations relative to said light incident surface but separated away from each other by a potential barrier section.

5. The solid-state image pickup device according to claim 1, further comprising:
   a read gate within said substrate at a location farther away from said light incident surface than said first photosensor.

6. The solid-state image pickup device according to claim 1, further comprising:
   a read gate provided in said substrate and adjacent said second photosensor relative to said light incident surface.

7. The solid-state image pickup device according to claim 1, wherein said photosenor section includes first and second color filters in registry with said first and second photosensors, respectively.

8. The solid-state image pickup device according to claim 1, wherein said first photosensor is larger than said second photosensor in the depth direction extending between said light incident and non-light incident sides of said substrate.

9. A solid-state image pickup device comprising:
   a substrate with a light incident side and a non-light incident side facing away from said light incident side;
   a photosensor section provided in said substrate, said photosensor section including a first photosensor particularly sensitive to light of a first wavelength and a second photosensor particularly sensitive to light of a second wavelength which is shorter than the first wavelength;
   a channel section in said substrate at a location beneath said second photosensor relative to said light incident surface; and
   a gate for transporting electric charge obtained as a result of a photoelectric conversion process carried out by said first photosensor to said channel section, wherein,
      said first photosensor extends toward said non-light incident side to an extent greater than does said second photosensor, and
      said first photosensor is particularly sensitive to a light beam of the red or green color and said second photosensor is particularly sensitive to a light beam of the blue color.

10. A solid-state image pickup device comprising:
    a substrate with a light incident side and a non-light incident side facing away from said light incident side;
    a photosensor section provided in said substrate, said photosensor section including a first photosensor particularly sensitive to light of a first wavelength and a second photosensor particularly sensitive to light of a second wavelength which is shorter than the first wavelength;
    a read gate provided in said substrate and adjacent said second photosensor relative to said light incident surface; and
    a channel section in said substrate and beneath said second photosensor relative to said light incident surface, wherein,
       said first photosensor extends toward said non-light incident side to an extent greater than does said second photosensor, and
       said read gate is effective to transport electric charge from said second photosensor to said channel section.

* * * * *